July 12, 1938. F. E. STAHL 2,123,864
CHAIN FASTENER
Filed May 12, 1937
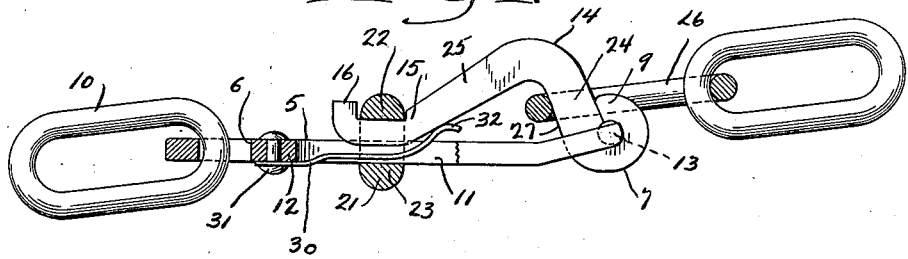
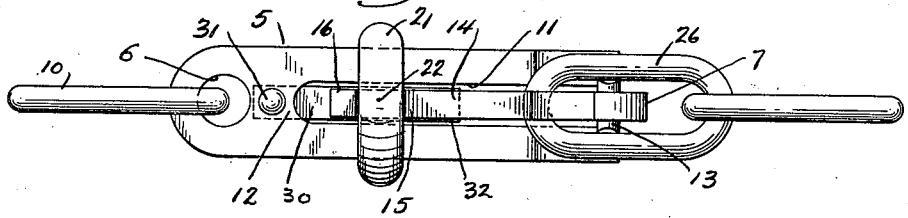
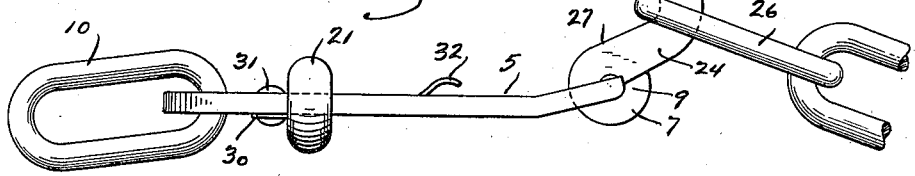
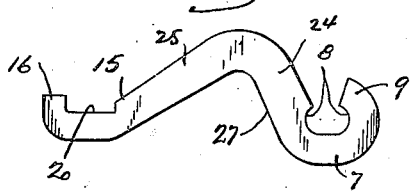
Inventor,
FRANK E. STAHL
by J. W. M. Ellis
Attorney Patented July 12, 1938

2,123,864

UNITED STATES PATENT OFFICE 2,123,864

CHAIN FASTENER

Frank E. Stahl, Tonawanda, N. Y., assignor to Columbus McKinnon Chain Corporation, Tonawanda, N. Y., a corporation of New York Application May 12, 1937, Serial No. 142,219

2 Claims. (Cl. 24—69)

My invention relates in general to chain fasteners, and in particular to fasteners for side chains of the "Weed" type antiskid devices.

The principal object of my invention has been to provide a device in which the parts thereof shall be symmetrically arranged about the longitudinal axis thereof.

Another object has been to provide a device which shall be light in weight, and simple and economical to manufacture.

Furthermore, my invention is so constructed that it may be securely locked against accidental opening, thereby securely holding the chain in position.

Moreover, my device is so designed that it may be easily operated when opening or closing.

The above objects and advantages have been accomplished by the device shown in the accompanying drawing, of which:

Fig. 1 is a side, sectional elevation of my complete device attached to the ends of the side chain of an anti-skid device.

Fig. 2 is a plan view of the same.

Fig. 3 is a side elevation of the fastener when being attached to the free end of the chain.

Fig. 4 is a side elevation of the latch lever showing the pivotal portion thereof before being assembled on the body.

My device comprises a body 5 which is formed at one end with an opening 6 with which the link 10 at one end of the side chain is permanently attached. The body, which is preferably made of a one-piece casting or stamping, is provided with a centrally arranged slot 11 separated from the opening 6 at one end by means of a cross bar 12 and formed at the other end with a pivot bar 13 which extends across the extreme end of the body.

At one end of the body of my device is provided the latch lever 14 which is pivotally mounted upon the pivot bar 13. This pivot bar is formed as a part of the body and is preferably circular in cross-section. So as to assemble the latch lever upon the pivot bar 13, the pivot end 7 of the latch lever is formed with a bendable arm 9, and interspaced recesses 8 are formed in opposite faces of the lever and the bendable arm. When the parts of my device are to be assembled, the recesses 8 of the pivot end 7 of the bar are placed about the pivot bar 13 of the body and the end 9 is bent toward the body part of the lever so as to bring the recesses together in pivotal engagement with the bar 13, thus providing the pivot opening for the latch lever.

The outer free end 15 of the latch lever is provided with an upstanding lug 16 behind which is a recess 20 for engagement with a lock clip 21. This lock clip is substantially oval-shaped and completely encircles the body 5 and the slot 11 formed therein. The clip is provided with a top bar 22 and a lower bar 23. The lower bar slides along the bottom surface of the body part and the top bar is interspaced sufficiently from the top surface of the body part to allow the passage of the lug 16 thereunder when the latch lever is depressed. The lever is formed with an upwardly extending arm 24 and with a rearwardly and downwardly extending arm 25. These arms are arranged at an angle with each other, as shown in the drawing, whereby a cam surface 27 is provided which will enable the operator to easily draw the free end of the chain toward the opposite end thereof and thus place the chain under the desired tension as the lever is being moved from the position shown in Fig. 3 to the closed position shown in Fig. 1. After the free end 15 of the lever has been forced down into the slot 11 between the side walls of the body 5, the lock clip 21 is drawn over the lug 16 to a position where it will be engageable with the notch 20 in the free end thereof. A flat spring 30 is secured at one end to the body 5 by means of a rivet 31 which is passed through the cross bar 12. The free end 32 of the spring extends forwardly toward the pivot bar 13 and upwardly into and through the slot 11, having such free end engaging with the under surface of the latch lever to force it upwardly into locking engagement with the lock clip. The cross bar 12 not only provides a surface to which to secure the end of the spring 12, but it separates the opening 6 from the slot 11, and thereby strengthens the structure. The body 5 is preferably bent upwardly slightly as shown at the end having the pivot 13.

When the link 26 at the free end of the side chain is to be released, it is only necessary to depress the latch lever 14 against the tension of the spring 30 to a position where the lock clip 21 will become disengaged with the recess 20 and may thus be passed over the lug 16, whereupon the latch lever will be free to rotate about its pivot bar 13 and thus release the engaging link 26.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A chain fastener comprising a one-piece body part formed with an eyelet at one end for permanent attachment to the side chain of an anti-skid device, and also being formed with a longitudinal slot, said slot terminating in a cross bar arranged between the end of the slot and the eyelet, the slot terminating at the opposite end in a pivot bar which extends across the extreme end of the body, a latch lever pivotally mounted upon the pivot bar and arranged symmetrically along the longitudinal body axis, said latch lever having its free end normally lying within the slot, a closed clip slidably mounted upon the body and completely encircling the same, said clip being engageable with the free end of the latch lever, and a spring having its outer end engageable with the free end of the latch lever, said spring being secured to the cross bar and having its free end extending through the clip and toward the pivot bar.

2. A chain fastener comprising a one-piece body part formed with an eyelet at one end for permanent attachment to the side chain of an anti-skid device, and also being formed with a longitudinal slot, said slot terminating in a cross bar arranged between the end of the slot and the eyelet, the slot terminating at the opposite end in a pivot bar which extends across the extreme end of the body, a latch lever pivotally mounted upon the pivot bar and arranged symmetrically along the longitudinal body axis, said latch lever having its free end normally lying within the slot and formed on its upper edge surface with a recess having parallel sides, a closed lock clip slidably mounted upon the body and completely encircling the same, said clip being of substantially the same width as the width of the recess and engageable with such recess in the free end of the latch lever, and a spring having its outer end engageable with the free end of the latch lever, said spring being secured to the cross bar and having its free end extending through the clip and toward the pivot bar.

FRANK E. STAHL.